June 29, 1926.

G. W. HOLLANDSWORTH

PLOW

Filed Nov. 26, 1923

Witnesses:

Inventor:
George W. Hollandsworth
By Joshua R. H. Posse
His Attorney.

June 29, 1926.
G. W. HOLLANDSWORTH
PLOW
Filed Nov. 26, 1923
1,590,191
2 Sheets-Sheet 2
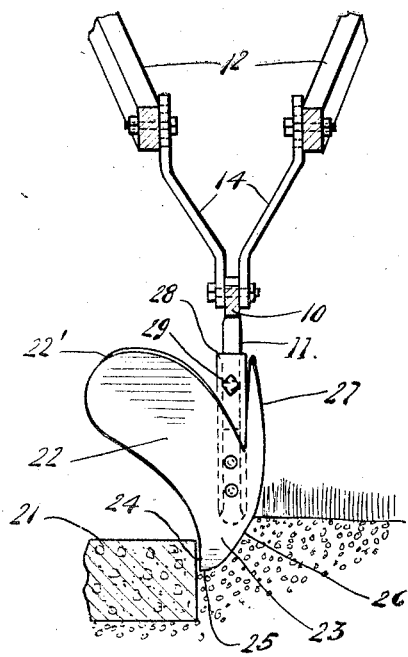
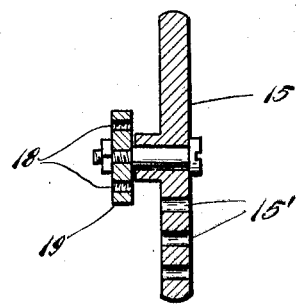
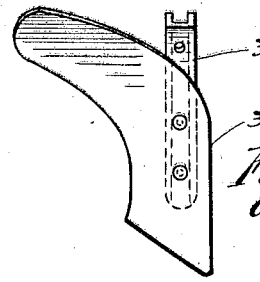
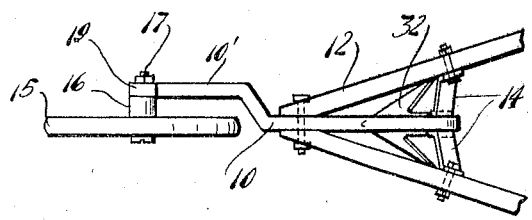
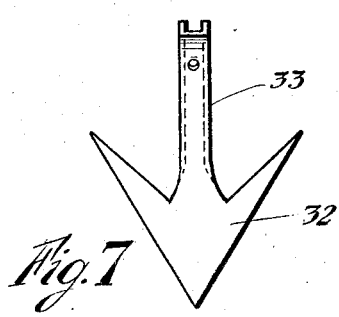
Witnesses:
Inventor:
George W. Hollandsworth
By Joshua R H Potts
His Attorney.

Patented June 29, 1926.

1,590,191

UNITED STATES PATENT OFFICE.

GEORGE W. HOLLANDSWORTH, OF KNOX, INDIANA.

PLOW.

Application filed November 26, 1923. Serial No. 677,143.

My invention relates to plows, and more particularly to a side-walk plow, and has for its main object the provision of a plow which is especially arranged for cutting a small groove or furrow along the edge of the side-walk, and casting the material onto said side-walk.

Another object is to provide a combination plow comprising interchangeable ground working members, intended to be adapted for general use around the yard and garden of the usual home.

These objects and other objects and advantages are attained with my invention, as will become apparent from the following description taken in connection with the accompanying drawings, in which, Fig. 1 is a plan view showing my invention in operation;

Fig. 3 is a vertical cross section taken on line 3—3 of Fig. 2, showing my side-walk plow in operation;

Fig. 4 is a cross section of the wheel taken on line 4—4 of Fig. 2;

Fig. 5 is a view of an ordinary plow with means for mounting it in position on the frame;

Fig. 6 is a view of the device with a shovel attached thereon, and the wheel placed at the center line of the frame;

Fig. 7 is a view of said shovel.

Figure 1:
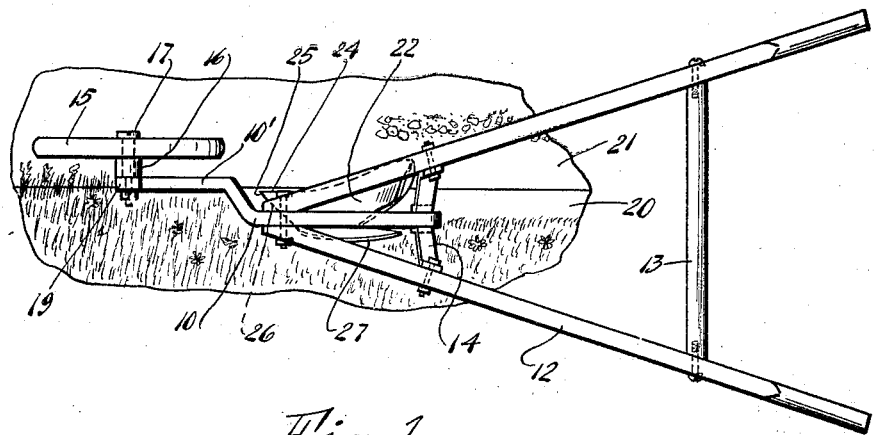

The preferred form of my invention, as illustrated in the drawings, comprises a frame including a beam 10 with an offset front part 10′ and a dependent part or bar 11 for carrying the operative or ground engaging parts of the plow. Handle bars 12 are fastened to said beam, a cross bar 13 connects said handle bars, and brace bars 14 retain the beam in fixed relation on the handles.

The wheel 15 is provided with a hub 16 on one side, which is preferably formed integral therewith, and a bolt 17, forming the axle, extends through said hub and through one of the holes 18 provided in a plate 19 at the front of part 11, for adjusting the height of the frame on the wheel. The wheel is preferably made in the form of a metal disk with perforations 15′ therein, as shown in Figures 1 and 4, and of sufficient weight to hold the front of the beam steady with respect to the surface of the ground.

Figure 2:
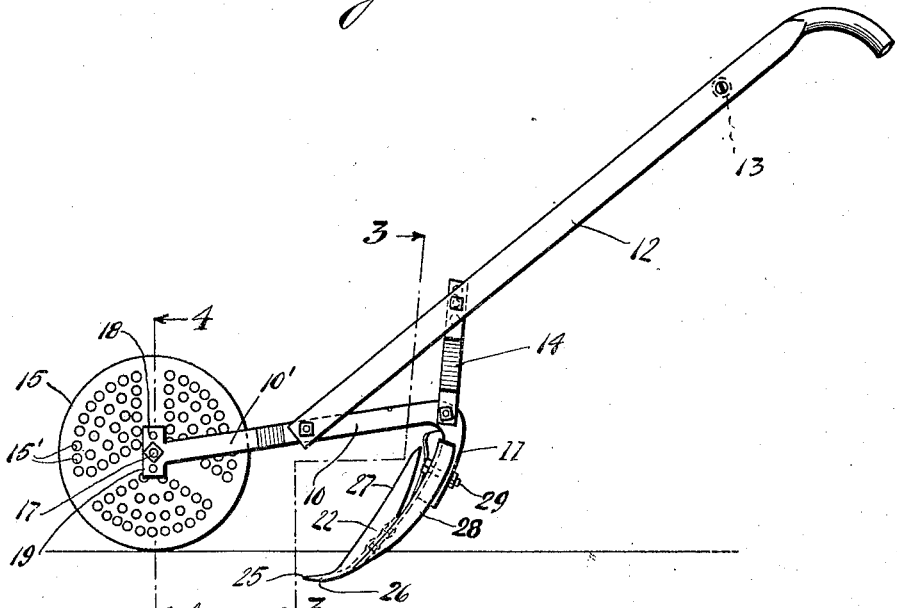
Fig. 2 is a side elevation thereof.

Various operative or ground engaging members are provided with my plow, and the essential one thereof, is the side-walk plow, shown in Figs. 1, 2, and 3, which is especially arranged for cutting a neat finishing groove or furrow 20 at each side edge of the side walk 21, as best shown in Figs. 1 and 3.

The particular form of side-walk plow which I have illustrated comprises a mold-board 22 with the usual curved ground turning upper portion 22′, and the plow-share or furrow cutting portion 23 which is preferably formed integral with said mold-board.

It is to be noted that the plow share in my side-walk plow is arranged in the reverse order with respect to the mold-board, from the usual type of plow, that is, my plow-share or cutting portion 23 has its side edge 24, with or without the usual land side, located toward the ground turning side 22′ on the mold-board, and extending a short distance upwardly in a vertical plane from the forward point 25 of the plow-share, then merging into the lower curved edge of the mold-board; while the front cutting edge 26 of my plow share is located at the opposite side and in front of the usual forward part of the mold-board, and a cutting blade 27 is provided on the front edge of the mold-board and extends upward from the plow-share, being, in fact, a continuation of the cutting edge 26 of the plow-share. Said cutting blade 27 is formed by cutting a slit at the upper edge of the mold-board, and thus permits the blade to form the front edge, and the main part of the mold-board to be bent over away from said blade for sufficiently deflecting the ground laterally onto the side-walk. A flanged or channel member 28 is secured to the mold-board, its flanges engaging bar 11, and a bolt 29 passes through a hole in said channel member and said bar 11 for detachably mounting the side-walk plow on the frame.

It is apparent from the above that my side-walk plow is particularly constructed for use along the edge of the side-walk, such as a cement walk as shown, and its side edge 24 cuts a vertical edge adjacent said side-walk, and the mold-board extends over the side-walk for the purpose of throwing the ground onto said side-walk, where it can readily be gathered and carried away; instead of throwing such ground onto the grass of the lawn, as is done with the usual plow whereby such grass is covered and its growth destroyed. The cutting blade 27 is especially useful with sod which extends above the walk, and said blade being curved for effectively deflecting the sod and ground onto the mold-board.

Fig. 5 shows an ordinary form of plow 30 with channel means 31 thereon for mounting it on frame bar 11, when the device is to be used as an ordinary plow for plowing ground.

Fig. 7 shows one form of shovel 32 with channel means 33 thereon for mounting it on the frame bar 11, and Fig. 6 shows this form of shovel mounted on the frame. Other forms of shovel are also provided and arranged for mounting on my frame.

It is to be noted that the wheel 15 is mounted on the front part 10' of the beam so as to travel in alinement with the beam 10 and the center line of the plow when the shovel 32 is mounted on the frame, as shown in Fig. 6; whereas said wheel 15 is mounted on the opposite side of part 10' of the beam when the side-walk plow is being used, as shown in Figs. 1 and 2, so that the wheel will travel on the straight side-walk and facilitate operating the plow member at the proper depth with regard to the surface of said side-walk, and cutting a neat and regular groove or channel 20.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A side-walk plow comprising a frame with a wheel traveling on the side-walk, a mold-board and a furrow cutting portion made integral therewith mounted on said frame, said portion having a cutting side edge extending rearwardly in a vertical plane from its front cutting point and movable along the edge of said side-walk, and said cutting point and cutting edge being positioned adjacent the ground turning side of the mold-board which moves over said side-walk to deposit material thereon, and a front cutting edge terminating in a cutting blade on said plow opposite said mold-board.

2. A plow comprising a frame with a depending bar and a beam with an offset front part, ground engaging members including a side-walk plow each having means thereon for interchangeably mounting it on said bar, and a wheel with an integral side hub arranged for mounting it on the offset side of said beam to travel on the side-walk for use with said side-walk plow, or for mounting it centrally on said beam for use with the other ground engaging members.

3. A plow comprising a frame with a depending bar and a beam with an offset front part, a cultivator shovel and a side-walk plow both having channel means thereon for interchangeably mounting them on said bar, and a wheel with an integral side hub arranged for mounting it centrally on said beam for use with said cultivator shovel, or for mounting it on the offset side of said beam to travel on the side-walk for use with said side-walk plow.

In testimony whereof I have signed my name to this specification.

GEORGE W. HOLLANDSWORTH.